United States Patent
Xi (10) Patent No.: US 11,241,795 B2
(45) Date of Patent: Feb. 8, 2022

(54) SOFT PACKAGE, ROBOT SYSTEM FOR PROCESSING THE SAME, AND METHOD THEREOF

(71) Applicants: Beijing Jingdong Shangke Information Technology Co., Ltd., Beijing (CN); JD.com American Technologies Corporation, Mountain View, CA (US)

(72) Inventor: Wei Xi, Mountain View, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 537 days.

(21) Appl. No.: 16/137,744

(22) Filed: Sep. 21, 2018

(65) Prior Publication Data
US 2020/0094415 A1    Mar. 26, 2020

(51) Int. Cl.
G05B 15/00     (2006.01)
G05B 19/00     (2006.01)
B25J 9/16      (2006.01)
B25J 15/00     (2006.01)

(52) U.S. Cl.
CPC ......... *B25J 9/1697* (2013.01); *B25J 15/0009* (2013.01)

(58) Field of Classification Search
CPC .... B25J 15/0009; B25J 9/1697; B25J 9/1612; G05B 2219/39571
See application file for complete search history.

(56) References Cited

U.S. PATENT DOCUMENTS

| 1,645,259 A | * | 10/1927 | Smith | B65D 90/623 |
| | | | | 294/68.24 |
| 3,618,174 A | * | 11/1971 | Schainholz et al. | A41F 1/002 |
| | | | | 24/303 |
| 5,169,198 A | * | 12/1992 | Volk | B65D 33/1633 |
| | | | | 294/137 |

(Continued)

FOREIGN PATENT DOCUMENTS

| CA | 2037822 A1 | 9/2019 |
| CN | 1474770 A | 2/2004 |

(Continued)

OTHER PUBLICATIONS

International Search Report and the Written Opinion of the International Searching Authority on PCT/CN2019/101611, dated Aug. 20, 2019.

*Primary Examiner* — Harry Y Oh
(74) *Attorney, Agent, or Firm* — China Science Patent & Trademark US LLC; Shanyun Lu (57) ABSTRACT

A soft package includes a package body made of a soft deformable material, and a plurality of rigid gripping components disposed at periphery or corners of the package body. Each of the rigid gripping components includes a rigid ring structure configured to be gripped by a robot device. A robot system may be used to process the soft package, by controlling a computer vision system of the robot system to capture images of the soft package, processing the images of the soft package to recognize the locations of the rigid gripping components, and controlling the robot devices of the robot system to grasp the rigid gripping components.

19 Claims, 9 Drawing Sheets

(56) References Cited

U.S. PATENT DOCUMENTS

| | | | | |
|---|---|---|---|---|
| 7,123,992 B2* | 10/2006 | Ban | ............ | B07C 5/10 |
| | | | | 700/258 |
| 7,313,464 B1* | 12/2007 | Perreault | ................ | B25J 9/1666 |
| | | | | 318/568.1 |
| 7,654,595 B2* | 2/2010 | Yokoyama | ............... | B25J 9/142 |
| | | | | 294/99.1 |
| 9,193,073 B1* | 11/2015 | Huang | ................... | B25J 9/1692 |
| 9,757,858 B2* | 9/2017 | Eto | ..................... | B25J 15/0616 |
| 10,471,597 B1* | 11/2019 | Murphy | ............... | B65G 1/1378 |
| 2010/0272378 A1* | 10/2010 | Mueller | ............... | B65D 90/205 |
| | | | | 383/67 |
| 2012/0306224 A1* | 12/2012 | Meza | ........................ | B66C 1/66 |
| | | | | 294/97 |
| 2013/0158710 A1* | 6/2013 | Oda | ........................ | B25J 9/1669 |
| | | | | 700/259 |
| 2014/0074288 A1* | 3/2014 | Satou | ..................... | B25J 9/1612 |
| | | | | 700/253 |
| 2015/0224650 A1* | 8/2015 | Xu | ......................... | B25J 9/1697 |
| | | | | 700/213 |
| 2015/0258684 A1* | 9/2015 | Harada | .................. | B25J 9/1612 |
| | | | | 700/259 |
| 2016/0075521 A1* | 3/2016 | Puchwein | ............ | B65G 1/1378 |
| | | | | 700/218 |
| 2016/0137435 A1* | 5/2016 | Tanaka | ..................... | B25J 9/023 |
| | | | | 414/564 |
| 2017/0137215 A1* | 5/2017 | Matias | ................. | B65D 90/048 |
| 2017/0326739 A1* | 11/2017 | Nakazato | ............... | B25J 9/1612 |
| 2018/0204176 A1* | 7/2018 | Eller | .................... | G06Q 10/083 |
| 2018/0285684 A1* | 10/2018 | Levinshtein | ......... | G06K 9/6215 |
| 2018/0333859 A1* | 11/2018 | Ban | ........................ | B25J 9/1612 |
| 2019/0263110 A1* | 8/2019 | Sharp | ..................... | B41J 3/40733 |
| 2019/0291282 A1* | 9/2019 | Marchese | ............... | B25J 9/1661 |
| 2019/0337152 A1* | 11/2019 | Homberg | ................ | B25J 9/1612 |
| 2020/0001458 A1* | 1/2020 | Zhang | ..................... | B25J 9/1697 |
| 2020/0269432 A1* | 8/2020 | Beinhofer | ............. | B25J 9/1697 |
| 2020/0338722 A1* | 10/2020 | Jang | ..................... | G06N 3/0454 |

FOREIGN PATENT DOCUMENTS

| | | | |
|---|---|---|---|
| CN | 206087773 U | | 4/2017 |
| CN | 108537841 A | * | 9/2018 |
| WO | 2017140920 A1 | | 8/2017 |

\* cited by examiner

SOFT PACKAGE, ROBOT SYSTEM FOR PROCESSING THE SAME, AND METHOD THEREOF

CROSS-REFERENCE TO RELATED PATENT APPLICATIONS

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The invention relates generally to robot and packaging technology, and more particularly to a soft package, a robot system for processing the same, and a method of processing the same.

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

Currently, internet shopping requires efficient fulfilment capabilities and low-cost logistic network. Thus, robot technology is an efficient way to manipulate packages by robotic hands or suction cups. For example, some of the robot systems such as Delta Robot use suction cups to grasp objects at picking work. In this case, it is easy to grasp solid bin packages by suction cups if there is a large smooth enough surface on each of the packages. However, for soft packages, there might be no large enough smooth surface thereon to guarantee a successful picking. In this case, grasping objects may be performed using device other than suction cups, such as grippers of the hook type or other grasping devices.

However, a soft package may deform during the packaging and subsequent moving process, and it will be difficult for the robot to grasp a soft package with different shapes without any large enough smooth surfaces, solid parts or hang holes for reliable grasping and/or hooking.

Therefore, an unaddressed need exists in the art to address the aforementioned deficiencies and inadequacies.

SUMMARY OF THE INVENTION

In certain aspects, the present invention relates to a soft package, which includes: a package body made of a soft deformable material; and a plurality of rigid gripping components disposed at periphery of the package body. In certain embodiments, the rigid gripping components are disposed at a plurality of corners of the package body. In certain embodiments, each of the rigid gripping components includes a rigid ring structure configured to be gripped by a robot device.

In certain embodiments, the package body has a substantially rectangular shape.

In certain embodiments, the rigid ring structure is magnetic.

In certain embodiments, each of the rigid gripping components further includes a visual guiding structure configured to be detected by a computer vision system.

In certain embodiments, the visual guiding structure is a colored structure.

In certain embodiments, the visual guiding structure is a tag having a computer recognizable code thereon.

In certain embodiments, the computer recognizable code is a barcode, a watermark, a quick response (QR) code, or an Apriltag code.

In certain embodiments, the robot device is a gripping device or a hook device.

In certain embodiments, the gripping device has an expandable gripping component configured to be switchable between a normal state and an expanded state; when the expandable gripping component is in the normal state, a size of the expandable gripping component is smaller than an inner size of the rigid ring structure such that the expandable gripping component is configured to be inserted into the rigid ring structure; and when the expandable gripping component is in the expanded state, the size of the expandable gripping component is expanded to fit the inner size of the rigid ring structure such that the expandable gripping component is configured to grip the rigid ring structure.

Certain aspects of the present invention relate to a robot system for processing a soft package. The robot system includes: a controller; a plurality of robot devices each being configured to grasp the soft package; where the soft package includes: a package body made of a soft deformable material; and a plurality of rigid gripping components disposed at periphery of the package body, wherein each of the rigid gripping components includes a rigid ring structure configured to be gripped by one of the robot devices; and a computer vision system configured to capture images of the soft package and to recognize locations of the rigid gripping components of the soft package. In certain embodiments, the rigid gripping components are disposed at a plurality of corners of the package body. In certain embodiments, the package body has a rectangular shape and has four corners.

In certain embodiments, the computer vision system includes a camera configured to capture the images of the soft package, and the controller is configured to process the images of the soft package captured by the camera and recognize the locations of the rigid gripping components of the soft package.

In certain embodiments, each of the robot devices is a gripping device or a hook device.

In certain embodiments, each of the rigid gripping components further comprises a visual guiding structure configured to be detected by the computer vision system.

In certain embodiments, the visual guiding structure is a colored structure.

In certain embodiments, the visual guiding structure is a tag having a computer recognizable code thereon, and the computer recognizable code is a barcode, a watermark, a quick response (QR) code, or an Apriltag code.

In certain embodiments, the controller is configured to: control the robot devices to grasp the rigid ring structure of at least two of the rigid gripping components of the soft package, such that each of the rigid ring structure of at least two of the rigid gripping components of the soft package is grasped by one of the robot devices; and control the robot devices grasping the at least two of the rigid gripping components of the soft package to flip the soft package.

In a further aspect of the present invention, a method for processing a soft package using a robot system includes:
- providing the soft package, where the soft package includes:
  - a package body made of a soft deformable material; and
  - a plurality of rigid gripping components disposed at periphery of the package body, wherein each of the rigid gripping components comprises a rigid ring structure configured to be gripped by one of a plurality of robot devices of the robot system;
- controlling a computer vision system of the robot system to capture images of the soft package;
- processing the images of the soft package to recognize the locations of the rigid gripping components; and
- controlling the robot devices of the robot system to grasp the rigid gripping components.

In certain embodiments, the rigid gripping components are disposed at a plurality of corners of the package body. In certain embodiments, the package body has a rectangular shape and has four corners.

In certain embodiments, each of the robot devices is a gripping device or a hook device.

In certain embodiments, each of the rigid gripping components further comprises a visual guiding structure configured to be detected by the computer vision system.

In certain embodiments, the method further includes: controlling the robot devices of the robot system to grasp the rigid ring structure of at least two of the rigid gripping components of the soft package, such that each of the rigid ring structure of at least two of the rigid gripping components of the soft package is grasped by one of the robot devices; and controlling the robot devices grasping the at least two of the rigid gripping components of the soft package to flip the soft package.

These and other aspects of the present invention will become apparent from following description of the preferred embodiment taken in conjunction with the following drawings and their captions, although variations and modifications therein may be affected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present invention.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

Figure 1A:
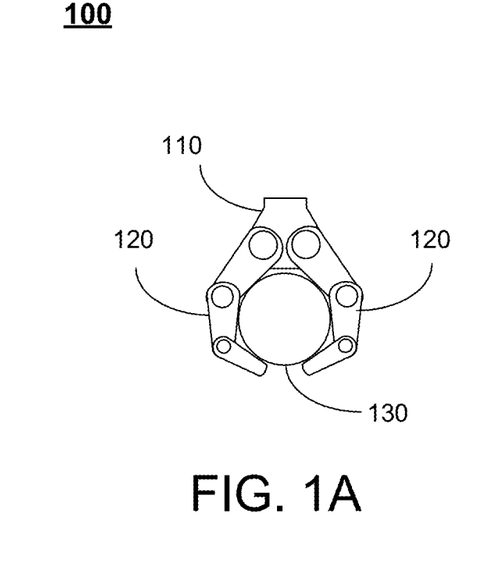
FIG. 1A is a schematic view of a gripping device according to one embodiment of the present invention, where the gripping device is in a gripping state.
Figure 1B:
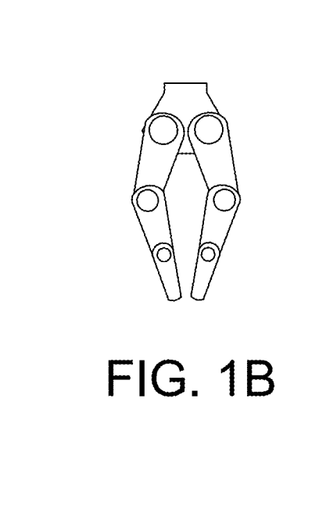
FIG. 1B is a schematic view of the gripping device as shown in FIG. 1A in a closed state.
Figure 1C:
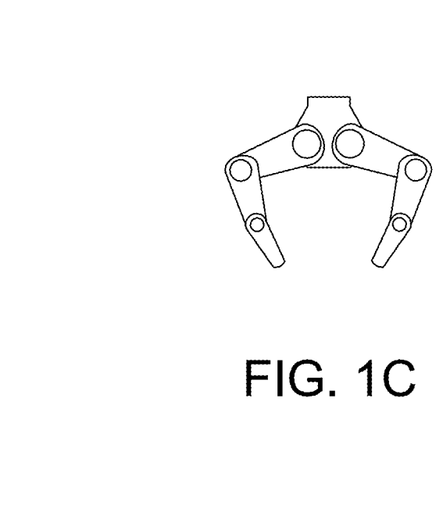
FIG. 1C is a schematic view of the gripping device as shown in FIG. 1A in an open state.

As discussed above, a gripping device may be used to grasp an object. For example, FIGS. 1A-1C show a gripping device according to certain embodiments of the present invention. As shown in FIG. 1A, the gripping device 100 is formed by a base 110 and two arm components 120, and each of the arm components 120 is formed by a plurality of movable sections that may relatively rotate from the base 110. FIG. 1A shows that the gripping device 100 is in a gripping state, where the arm components 120 may form a specific angle to grip an object 130 within the space formed by the arm components 120. In contrast, FIG. 1B shows that the gripping device 100 is in a closed state, and FIG. 1C shows that the gripping device 100 is in an open state.

However, a soft package may be formed by a soft, deformable material that allows the shape of the soft package to change randomly. In this case, there will be no fixed surface for the gripping device 100 as shown in FIGS. 1A-1C to grip the soft package. Thus, in order to ensure successful gripping, one aspect of the present invention provides a soft package with rigid gripping components.

Figure 2A:
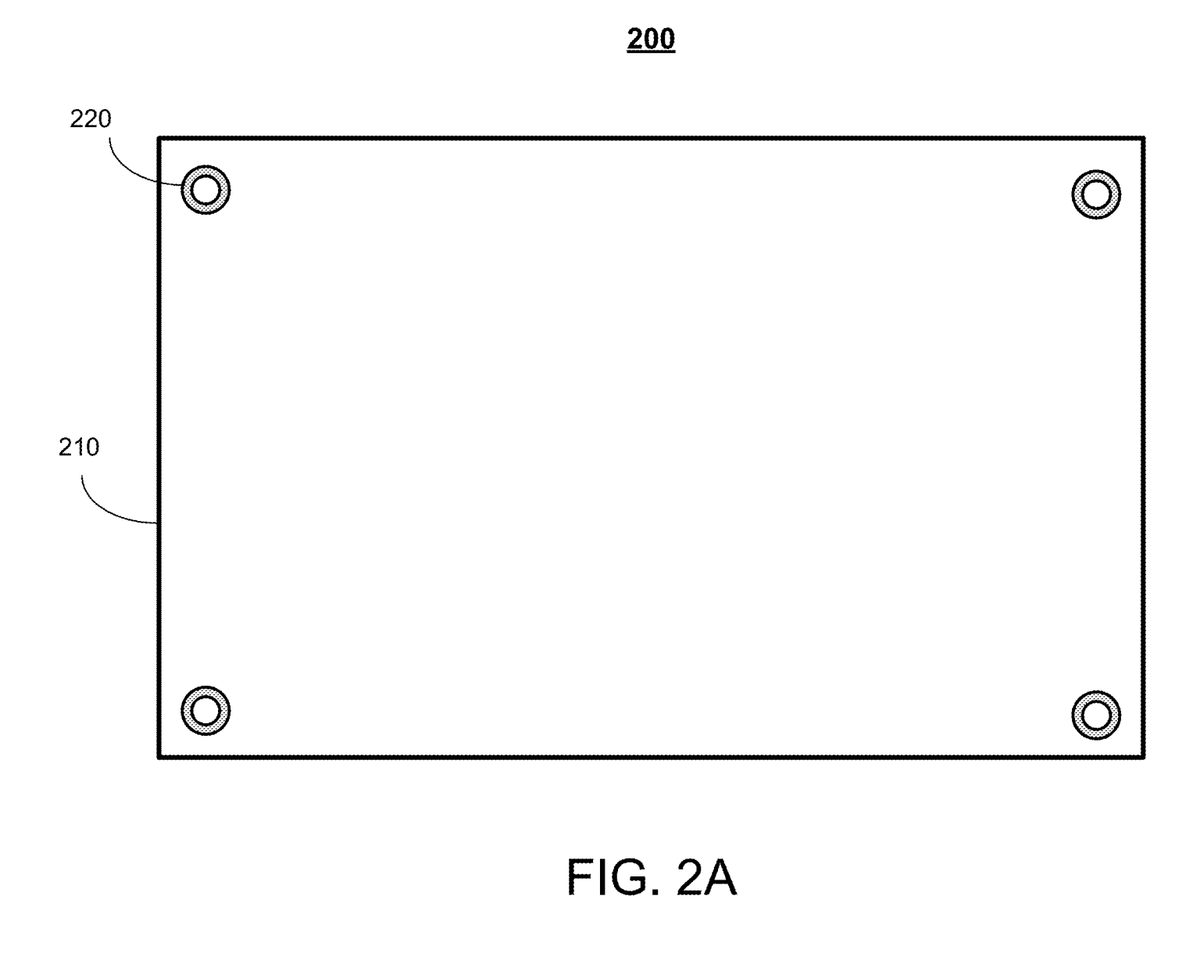
FIG. 2A is a schematic view of a soft package according to one embodiment of the present invention, where the soft package is in a flat empty state.
Figure 2B:
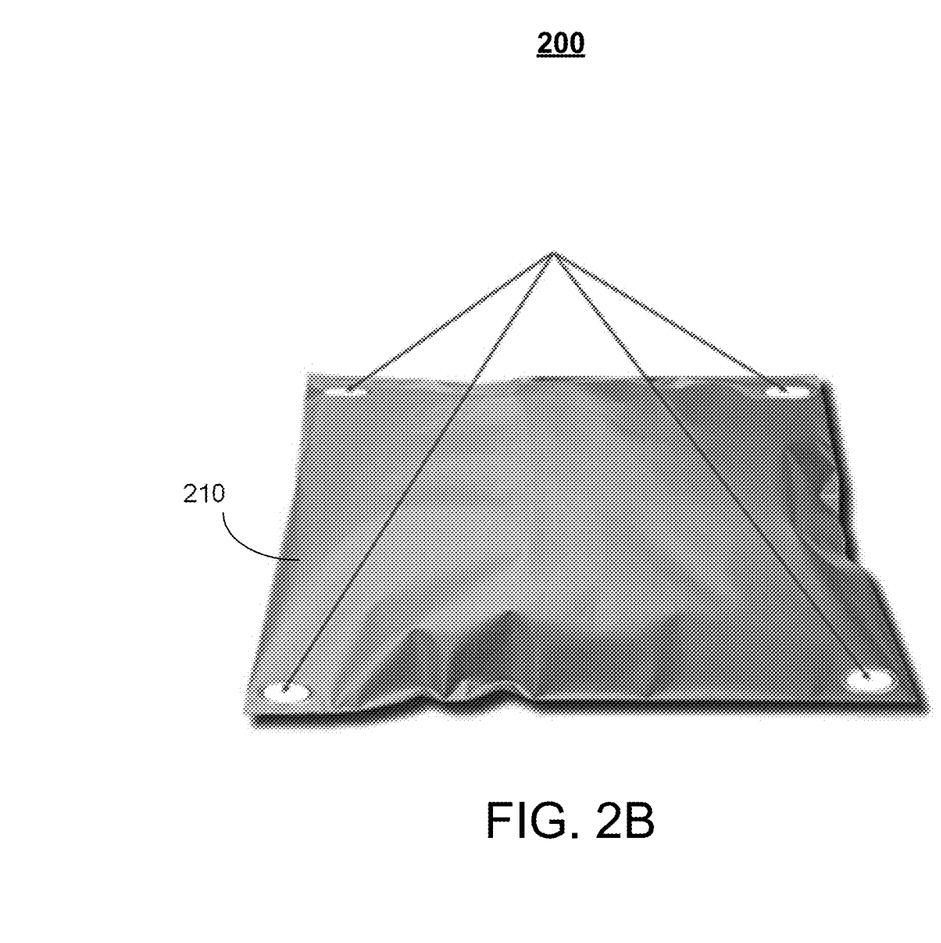
FIG. 2B is a schematic view of the soft package as shown in FIG. 2A in a packaging state.

FIGS. 2A and 2B show a soft package according to certain embodiments of the present invention. As shown in FIG. 2A, the soft package 200 includes a package body 210, which is in a substantially rectangular shape in a flat empty state, and four rigid gripping components 220 disposed at the four corners of the packaging body 210. The package body 210 is made of a soft, deformable material, which allows the package body 210 to deform in the packaging process. FIG. 2B shows the soft package in a packaging state, where the package body 210 is deformed to package the object therein. In comparison, each of the rigid gripping components 220 is formed by a "rigid" material, meaning that the rigidity of the rigid gripping components 220 is much better than the deformable material such that the rigid gripping components 220 may not be as easily deformed as the package body 210 are. In this case, the rigid gripping components 220 provide relatively solid parts for a robot system to interact. As shown in FIG. 2A, each of the rigid gripping components 220 is a rigid ring structure, which is configured to be gripped by a robot device, such as the gripping device 100 as shown in FIGS. 1A-1C, or any other gripping devices or hook devices.

In operation, the package body 210 of the soft package may not have any large enough fix surface thereon to guarantee a successful gripping. However, the rigid ring structure of each of the rigid gripping components 220 may provide multiple gripping or hooking structures for a robot system to grip or hook therein. For example, the robot system may include multiple robot devices (each of which may be the gripping device 100, or any other gripping devices or hooking devices), and each of the robot devices may be operated to grip or hook in the rigid ring structure of a corresponding one of the rigid gripping components 220, thus implementing the picking of the soft package 200.

In certain embodiments, the rigid ring structure of each of the rigid gripping components 220 may be magnetic, such that the gripping device 100 may easily detect the location of the rigid ring structure.

In the embodiment show in FIG. 2A, the package body 210 is in a substantially rectangular shape in a flat empty state. In certain embodiments, the package body 210 may have a circular shape or an oval shape, and the rigid ring structure is distributed along the periphery of the circular or oval shaped package body 210. The number of the rigid ring structure on the circular or oval package body 210 may be two, three, four or more than four, and the rigid ring structure is preferably evenly distributed along the periphery of the package body 210. In certain embodiments, the package body 210 may have a triangular shape, a trapezoidal shape, or other polygon shape, and the plurality of rigid ring structure is preferably located at the periphery, such as corners of the package body 210.

In this embodiment, the rigid ring structure forms a circular hole. In other embodiments, the rigid ring structure may have an oval shape or a polygon shape. In certain embodiments, the polygon shape includes triangular shape, rectangular or trapezoidal shape, pentagon shape, hexagon shape, octagon shape, dodecagon shape, etc. In certain embodiments, when the rigid ring structure has a pentagon or hexagon shape, a robotic operator or robotic arm may pick up the rigid ring structure easily and hold the rigid ring structure firmly according to the shape of the robotic operator.

Figure 2C:
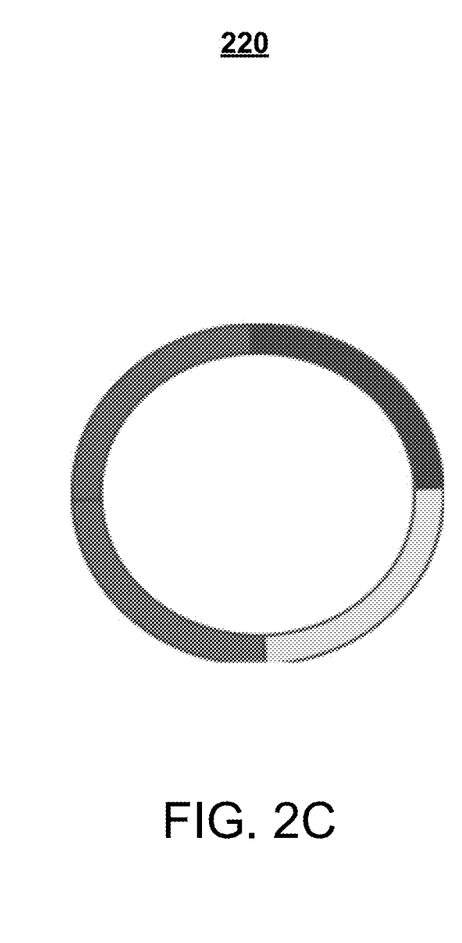
FIG. 2C is a schematic view of a rigid gripping components of FIG. 2A or FIG. 2B.

In certain embodiments, each of the rigid gripping components 220 further may include a visual guiding structure configured to be detected by a computer vision system of the robot system, such that the computer vision system may determine the location of each of the rigid gripping components 220. In certain embodiments, the visual guiding structure may be a colored structure, which has a different color from the package body 210 such that it is easier for the computer vision system to recognize the visual guiding structure. For example, as shown in FIG. 2C, the rigid gripping component 220 is divided into four portions, each of the portions has a specific red, blue, green and yellow color, such that the rigid gripping component 220 is easily recognized by a visions system. To efficiently assist the operation of the system, the number of colors of the rigid gripping component 220 can be 1-3 or more than four; and the rigid gripping components 220 of the same soft package 200 may have the same color pattern or different color patterns. In certain embodiments, a simple way to implement the visual guiding structure is to provide a colored ring structure for each of the rigid gripping components 220, such that the colored ring structure functions as both the rigid ring structure and the colored visual guiding structure.

Figure 2D:
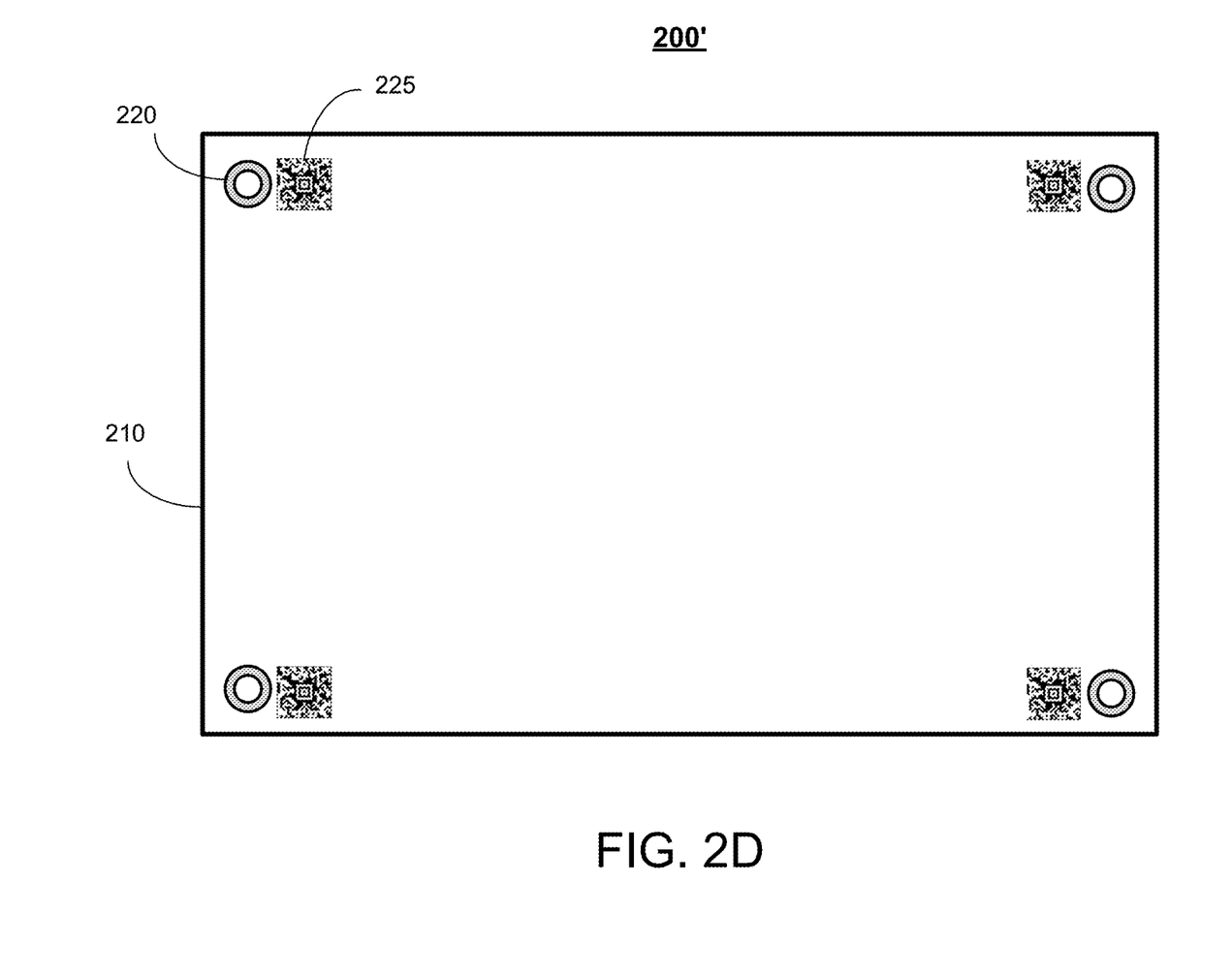
FIG. 2D is a schematic view of a soft package according to another embodiment of the present invention, where each of the rigid gripping components includes a tag.

Alternatively, the rigid ring structure and the visual guiding structure may be separate structures. For example, FIG. 2D shows a soft package 200' according to a different embodiment of the present invention. The difference between the soft package 200' as shown in FIG. 2D and the soft package 200 as shown in FIG. 2A exists in that each of the rigid gripping components 220 includes not only the rigid ring structure, but also a tag 225 having a computer recognizable code thereon. In certain embodiments, the tag 225 must also be rigid and not easily deformed, such that the computer recognizable code thereon may be generally recognizable. As shown in FIG. 2D, the computer recognizable code on the tag 225 is a quick response (QR) code, which may include information of the soft package 220', such that the computer vision system may recognize the information of the soft package 220' by scanning the QR code. In addition, the tag 225 may also help the computer vision system to more accurately locate the rigid ring structure of the corresponding rigid gripping component 220. In certain embodiments, the computer recognizable code on the tag 225 may also a barcode, a watermark, an Apriltag code, or any other forms of computer recognizable code. The tags 225 in each corner may be the same or different from each other. When the tags 225 in the four corners are different from each other, each tag 225 may include specific information corresponding to the corresponding corner.

It should be noted that, although FIG. 2D shows that the tag 225 are formed on the package body 210, the location of the tag 225 may be varied. In certain embodiments, for example, the tag 225 may be an extended part from the package body 210.

Figure 2E:
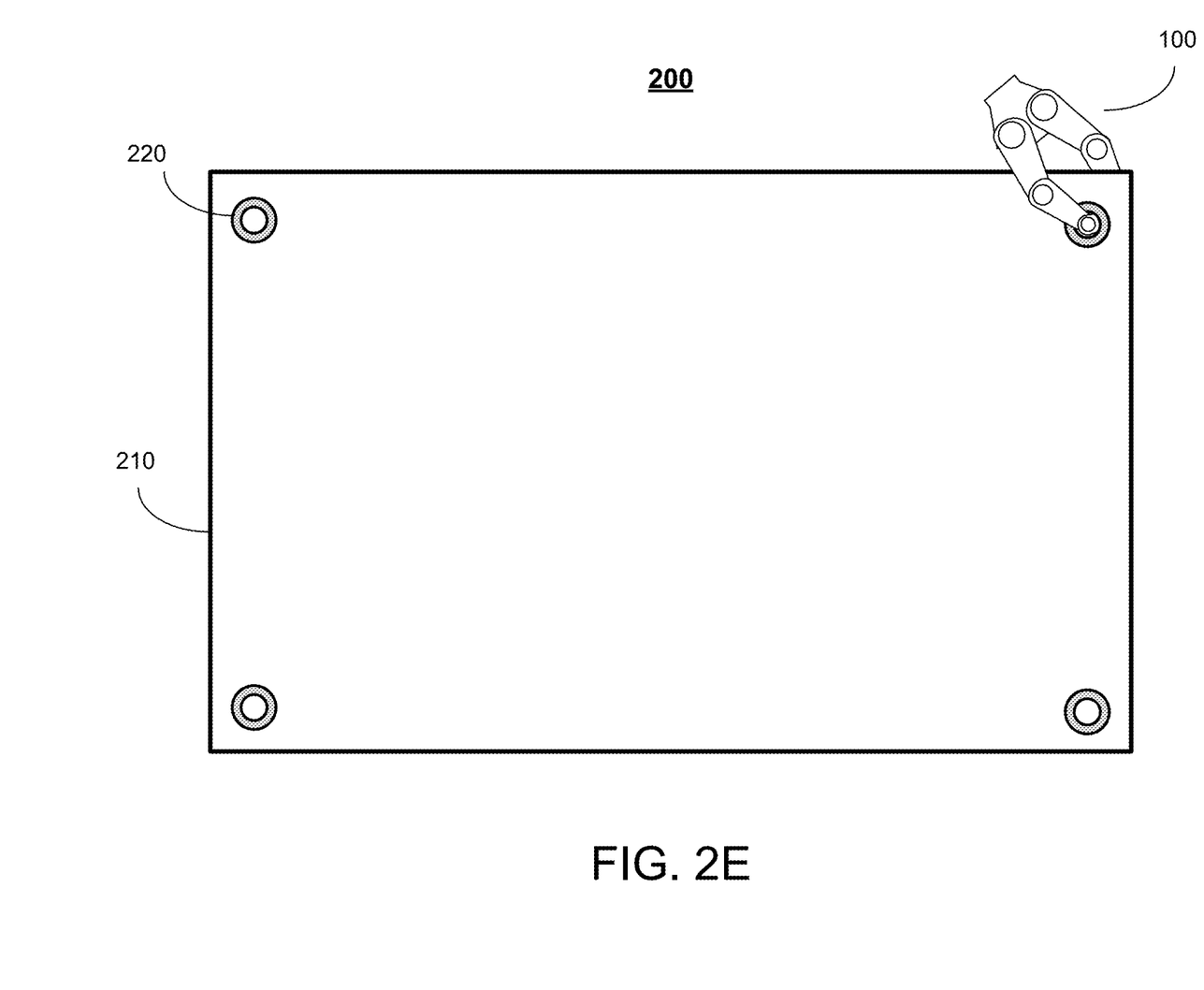
FIG. 2E is a schematic view of gripping the soft package of FIG. 2A using the gripping device shown in FIGS. 1A-1C.
Figure 2F:
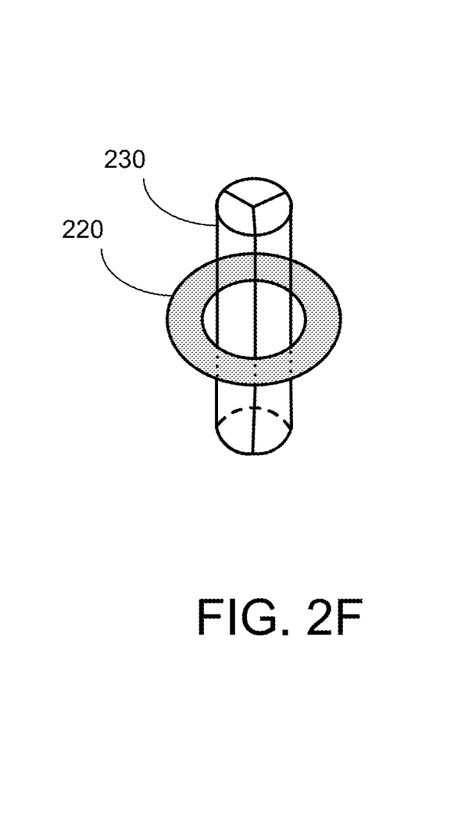
FIG. 2F is a schematic view of inserting an expandable gripping component into a rigid ring structure of the rigid gripping component according to certain embodiments of the present disclosure.
Figure 2G:
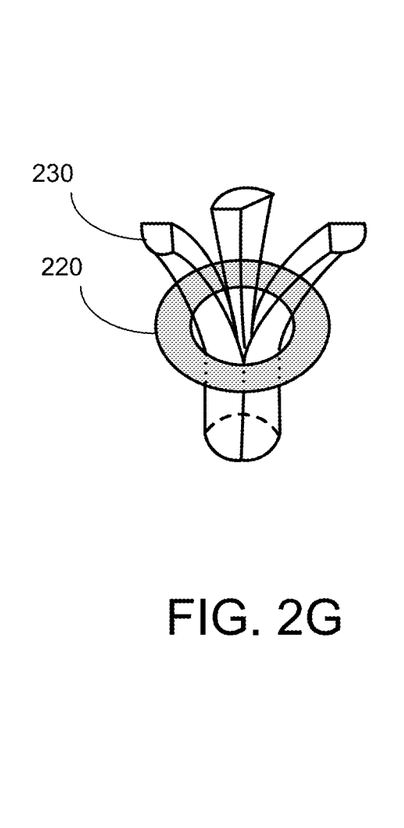
FIG. 2G is a schematic view of expansion of the expandable gripping component in the rigid ring structure.
Figure 2H:
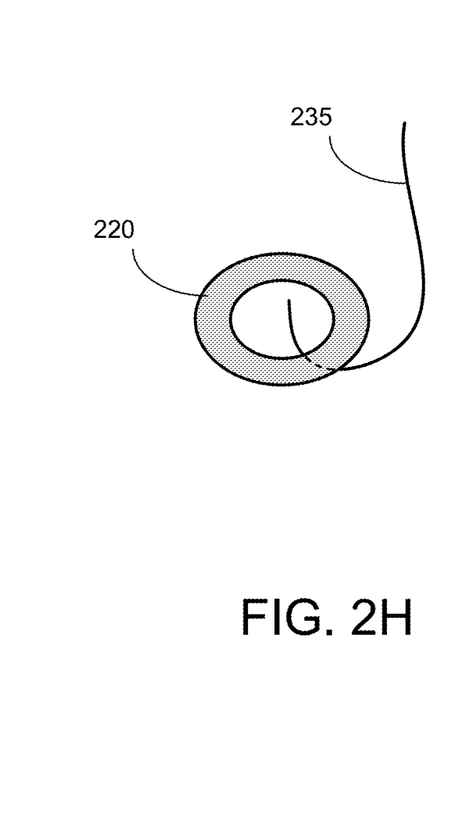
FIG. 2H is a schematic view of hooking a rigid ring structure using a hook.

As shown in FIG. 2E, tips of the gripping device 100 can be inserted into the rigid ring structure of the rigid gripping components 220 and close, so as to pick up the soft package 200. However, as discussed above, the robot device to process the soft package 200 is not limited to the gripping device 100 as shown in FIGS. 1A-1C. In certain embodiments, as shown in FIG. 2F and FIG. 2G, the gripping device may be an expandable gripping device, which has an expandable gripping component 230 configured to be switchable between a normal state and an expanded state. When the expandable gripping component 230 is in the normal state as shown in FIG. 2F, a size of the expandable gripping component 230 is smaller than an inner size of the rigid ring structure of each of the rigid gripping components 220, such that the expandable gripping component 230 is configured to be inserted into the rigid ring structure. When the expandable gripping component is in the expanded state, as shown in FIG. 2G, the size of the expandable gripping component is expanded to fit the inner size of the rigid ring structure of each of the rigid gripping components 220, such that the expandable gripping component 230 is configured to grip the rigid ring structure. Examples of the expandable gripping device may be available in the market, such as the IDG expansion griper, which is a pneumatic gripper where 3 small fingers can be expanded to grab a hole type stuff (as shown in FIG. 2F and FIG. 2G); or an expansion gripper by compressing an elastic expander or inflate a bladder to grab the hole. In certain embodiments, as shown in FIG. 2H, the gripping device may also be a hooking device, and a hook 235 of the hooking device can be used to hook the rigid ring structure of the rigid gripping component 220. Therefore, the operation of the soft packages can be performed using one of the rigid gripping components 220, or using two of the rigid gripping components 220. In other embodiments, it is also possible to use three or all four of the rigid gripping components 220 to operate a soft package 200 using a robot or a gripper.

Figure 3:
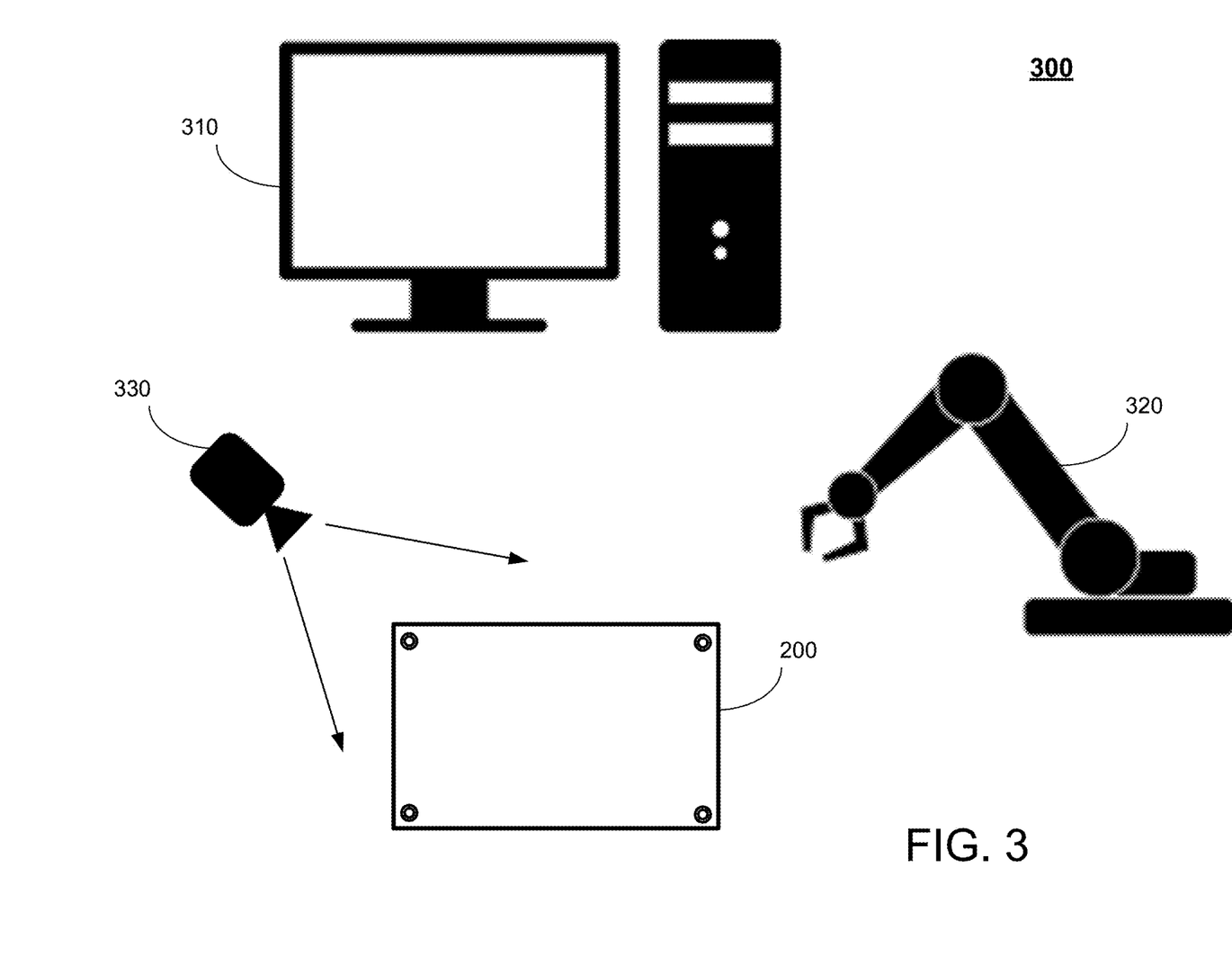
FIG. 3 is a schematic view of a robot system according to one embodiment of the present invention.

In another aspect of the present invention, a robot system may be provided to process the soft package as described above. For example, FIG. 3 is a schematic view of a robot system according to one embodiment of the present invention. As shown in FIG. 3, the robot system 300 includes a controller 310, a plurality of robot devices 320, and a computer vision system 330. The controller 310 is used to control the robot devices 320 and the computer vision system 330 to process the soft package, which may be the soft package 200 as described in any of the embodiments above. Each of the robot devices 320 may be a gripping device 100, or any other gripping devices or hook devices. The computer vision system 330 may be a scanning device, which may include a camera, which is used to capture images of the soft package 200, and a corresponding software component such as an image recognition software, which is used to recognize locations of the rigid gripping components 220 of the soft package 200. The controller 310 is connected to the robot devices 320 and the computer vision system 330 in order to control the robot devices 320 to process the soft package 200, and control the computer vision system 330 to recognize the locations of the rigid gripping components 220 of the soft package 200.

Figure 4:
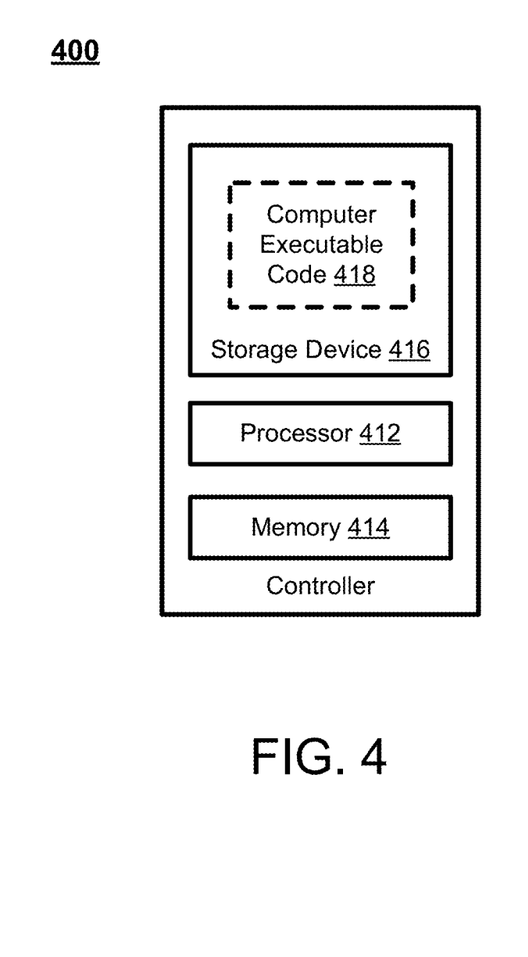
FIG. 4 is a schematic view of a controller of the robot system according to one embodiment of the present invention.

FIG. 4 is a schematic view of a controller of the robot system according to one embodiment of the present invention. As shown in FIG. 4, the controller 400 may be a computing device, which includes a processor 412, a memory 414, and a storage device 416 storing computer executable code 418.

The processor 412 controls operation of the controller 410. In certain embodiments, the processor 412 may be a central processing unit (CPU). The memory 414 may be a volatile memory, such as the random-access memory (RAM), for storing the data and information during the operation of the controller 410. In certain embodiments, the memory 414 may be a volatile memory array. In certain embodiments, the controller 410 may run on more than one processor 412 and/or more than one memory 414.

The storage device 416 is a non-volatile data storage media or device for storing the computer executable code 418 of the controller 410. Examples of the storage device 516 may include flash memory, memory cards, USB drives, or other types of non-volatile storage devices such as hard drives, floppy disks, optical drives, or any other types of data storage devices. In certain embodiments, the controller 410 may have more than one storage device 416.

The computer executable code 418 include the code or instructions which, when executed at the processor 412, may perform certain features to control the operation of the robot devices 320 and the computer vision system 330 as shown in FIG. 3. Specifically, examples of these features may include, without being limited thereto, controlling the robot devices 320 to grasp the rigid ring structure of one or more of the rigid gripping components 220 of the soft package 200; controlling the computer vision system 330 to capture images of the soft package 200; and processing the images of the soft package to recognize the locations of the rigid gripping components 220.

It should be noted that the soft package 200, when being processed, does not always come individually. For example, a plurality of soft packages 200 may be accumulated and processed altogether by a robot system 300 as shown in FIG. 3. In this case, each of the soft packages 200 to be processed may be put in a package pile. Since all soft packages 200 may be palletized in disorder during the piling and transporting process, some of the soft packages 200 may be deformed or sandwiched in an occluded position by other packages or objects, such that not all of the four rigid gripping components 220 are exposed. In this case, for each of the soft packages 200, as long as the soft package 200 is not completely buried in the pile, at least one of the corners of the soft package 200 is likely exposed to be detectable by the computer vision system 330 of the robot system 300, such that the soft package 200 may provide at least one rigid gripping component 220 to be grasped by the robot system 300. In other words, with all four corners of the soft package 200 having the rigid gripping components 220, a successful grasping of the soft package 200 can be better guaranteed. Moreover, in certain embodiments, if some of the four rigid gripping components 220 are not detected by the computer vision system 330 of the robot system 300, the robot system 300 may recognize that at least a part of the soft package 200 is occluded. If the robot system 300 detects that multiple soft packages 200 are occluded, the robot system 300 may determine that the soft packages 200 are palletized in disorder.

In certain embodiments, the robot system 300 may be configured to control the robot devices 320 to perform a flipping action to the soft package 220. For example, if the controller 400 of the robot system 300 determines that the soft package 200 has at least two recognizable rigid gripping components 220, the robot system 300 may use these at least two recognizable rigid gripping components 220 to perform flipping of the soft package 220. Specifically, the controller 400 may control the robot devices 320 to grasp the rigid ring structure of the at least two recognizable rigid gripping components 220 of the soft package 200, such that each of the rigid ring structure of the at least two recognizable rigid gripping components 220 is grasped by one of the robot devices 320. In other words, the soft package 200 is grasped by at least two of the robot devices 320. Then, the controller 400 may control the at least two robot devices 320 grasping the at least two rigid gripping components 220 of the soft package 200 to flip the soft package 200.

Figure 5:
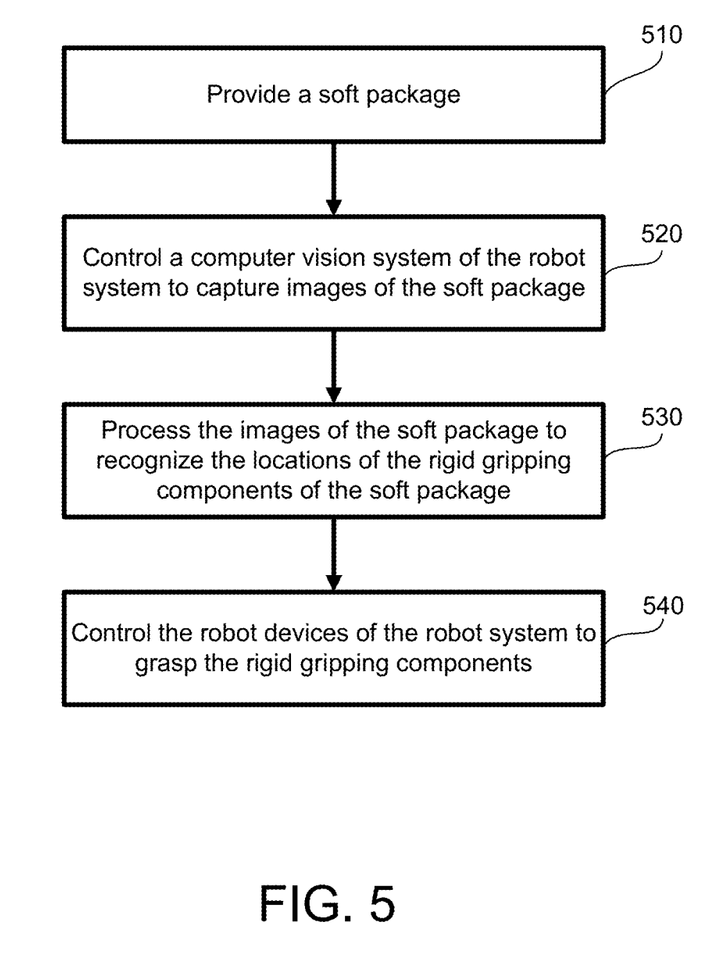
FIG. 5 is a flowchart showing a method of processing a soft package using a robot system according to one embodiment of the present invention.

In a further aspect of the present invention, a method of processing a soft package may be performed using the robot system 300 as shown in FIG. 3 and the controller 400 as shown in FIG. 4. For example, FIG. 5 is a flowchart showing a method of processing a soft package using a robot system according to one embodiment of the present invention. In certain embodiments, the method as shown in FIG. 5 may be implemented on the robot system 300 as shown in FIG. 3 and the controller 400 as shown in FIG. 4, and the soft package being processed by the method as shown in FIG. 5 may be a soft package 200 as described in any of the embodiments above. It should be particularly noted that, unless otherwise stated in the present disclosure, the steps of the method may be arranged in a different sequential order, and are thus not limited to the sequential order as shown in FIG. 5.

As shown in FIG. 5, when a robot system 300 as shown in FIG. 4 is provided, at procedure 510, a soft package 200 may be provided to be processed. The soft package 200 may include a soft, deformable package body 210 and a plurality of rigid gripping components 220. Then, at procedure 520, the controller 400 may control the computer vision system 330 to capture images of the soft package 200. In certain embodiments, each of the rigid gripping components 220 may further include a visual guiding structure, such as a colored structure or a tag, which is easily detected by the computer vision system 330. At procedure 530, the controller 400 may process the image of the soft package 200 to recognize the locations of the rigid gripping components 220 of the soft package 200. Once the locations of the rigid gripping components 220 of the soft package 200 are recognized, at procedure 540, the controller 400 may control the robot devices 320 to grasp the rigid gripping components 220.

Figure 6:
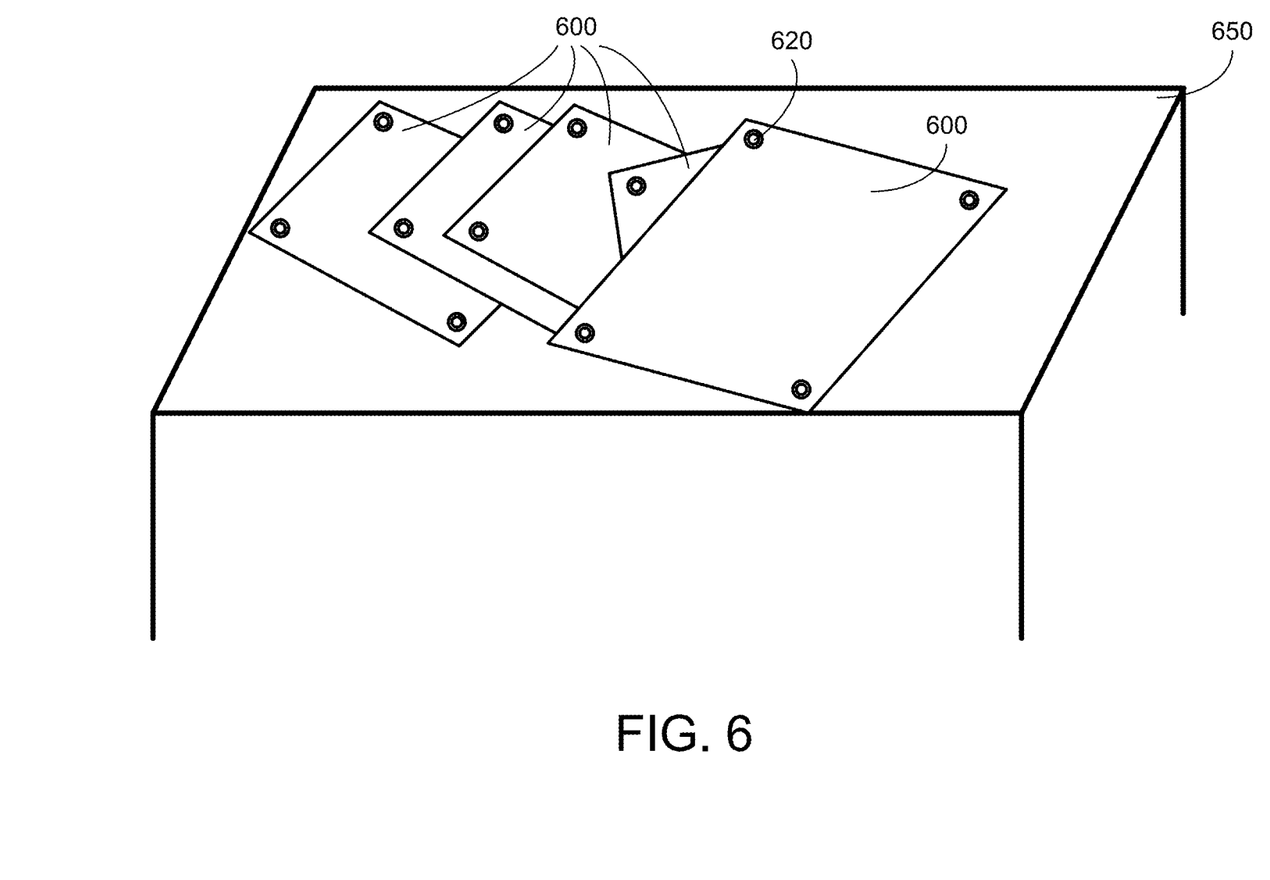
FIG. 6 is a schematic view of multiple soft packages for being processed according to one embodiment of the present invention.

During operation on a plurality of soft packages or a mix of soft packages and rigid packages, one or more corners of the soft packages may be blocked by other packages. FIG. 6 is a schematic view of multiple soft packages for being processed according to one embodiment of the present invention. Referring back to the description of FIG. 3 and as shown in FIG. 6, a plurality of soft packages 600 are stacked on a platform 650. Each of the soft packages 600 has four rigid gripping components 620. However, the number of rigid gripping components 620 for each soft package 600 that are exposed for operating by a robot varies. The exposed rigid gripping component 620 for each soft package could be one, two, three or four, based on its size, orientation, and its location in the stack. Therefore, according to certain embodiments of the present invention, it is likely that each of the soft packages 600 at least have one rigid gripping components 620 exposed outside, such that the robot as shown in FIG. 3 can pick up any one of the soft packages using one, two, three or four of the exposed rigid gripping components 620 easily.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A soft package, comprising:
a package body made of a soft deformable material; and
a plurality of rigid gripping components disposed at a periphery of the package body,
wherein the package body has a first surface and a second surface opposite to the first surface, each of the rigid gripping components comprises a rigid ring structure to be picked up by a robot device, and the rigid ring structure is embedded in the package body and penetrates the first surface and the second surface of the package body; and
wherein the robot device comprises at least one of an expandable gripping device and a hooking device, the expandable gripping device has an expandable gripping component insertable into the rigid ring structure so as to grip the soft package through the rigid ring structure, and the hooking device is configured to grip the soft package by hooking the rigid ring structure.

2. The soft package of claim 1, wherein the package body has a substantially rectangular shape, and the rigid gripping components are disposed at four corners of the package body.

3. The soft package of claim 1, wherein the rigid ring structure is magnetic.

4. The soft package of claim 1, wherein a visual guiding structure is further provided for each of the rigid gripping components, and the visual guiding structure is configured to be detected by a computer vision system.

5. The soft package of claim 4, wherein the visual guiding structure is a colored structure.

6. The soft package of claim 4, wherein the visual guiding structure is a tag having a computer recognizable code thereon.

7. The soft package of claim 6, wherein the computer recognizable code is a barcode, a watermark, a quick response (QR) code, or an Apriltag code.

8. The soft package of claim 1, wherein:
the robot device comprises the expandable gripping device, the expandable gripping component is configured to be switchable between a normal state and an expanded state;
when the expandable gripping component is in the normal state, a size of the expandable gripping component is smaller than an inner size of the rigid ring structure such that the expandable gripping component is configured to be inserted into the rigid ring structure; and
when the expandable gripping component is in the expanded state, the size of the expandable gripping component is expanded to fit the inner size of the rigid ring structure such that the expandable gripping component is configured to grip the rigid ring structure.

9. A robot system for processing a soft package, comprising:
a controller;
a plurality of robot devices each being configured to grasp the soft package; wherein the soft package comprises:
a package body made of a soft deformable material; and
a plurality of rigid gripping components disposed at a periphery of the package body,
wherein each of the rigid gripping components comprises a rigid ring structure configured to be gripped by one of the robot devices; and
wherein each of the robot devices comprises at least one of an expandable gripping device and a hooking device, the expandable gripping device has an expandable gripping component insertable into the rigid ring structure to grip the soft package through the rigid ring structure, and the hooking device is configured to grip the soft package by hooking the rigid ring structure; and
a computer vision system configured to capture images of the soft package and to recognize locations of the rigid gripping components of the soft package.

10. The robot system of claim 9, wherein the computer vision system comprises a camera configured to capture the images of the soft package, and the controller is configured to process the images of the soft package captured by the camera and recognize the locations of the rigid gripping components of the soft package.

11. The robot system of claim 9, wherein:
each of the robot devices comprises the expandable gripping device, the expandable gripping component is configured to be switchable between a normal state and an expanded state;
when the expandable gripping component is in the normal state, a size of the expandable gripping component is smaller than an inner size of the rigid ring structure such that the expandable gripping component is configured to be inserted into the rigid ring structure; and when the expandable gripping component is in the expanded state, the size of the expandable gripping component is expanded to fit the inner size of the rigid ring structure such that the expandable gripping component is configured to grip the rigid ring structure.

12. The robot system of claim 9, wherein a visual guiding structure is further provided for each of the rigid gripping components, and the visual guiding structure is configured to be detected by the computer vision system.

13. The robot system of claim 12, wherein the visual guiding structure is a colored structure.

14. The robot system of claim 12, wherein the visual guiding structure is a tag having a computer recognizable code thereon, and the computer recognizable code is a barcode, a watermark, a quick response (QR) code, or an Apriltag code.

15. The robot system of claim 9, wherein the controller is configured to:

control the robot devices to grasp the rigid ring structure of at least two of the rigid gripping components of the soft package, such that each of the rigid ring structure of at least two of the rigid gripping components of the soft package is grasped by one of the robot devices; and control the robot devices grasping the at least two of the rigid gripping components of the soft package to flip the soft package.

16. A method for processing a soft package using a robot system, comprising:

providing the soft package, wherein the soft package comprises:

a package body made of a soft deformable material; and a plurality of rigid gripping components disposed at a periphery of the package body, wherein each of the rigid gripping components comprises a rigid ring structure configured to be gripped by one of a plurality of robot devices of the robot system, each of the plurality of robot devices comprises at least one of an expandable gripping device and a hooking device, the expandable gripping device has an expandable gripping component insertable into the rigid ring structure to grip the soft package through the rigid ring structure, and the hooking device is configured to grip the soft package by hooking the rigid ring structure;

controlling a computer vision system of the robot system to capture images of the soft package;

processing the images of the soft package to recognize the locations of the rigid gripping components; and controlling the robot devices of the robot system to grasp the rigid gripping components.

17. The method of claim 16, wherein:

each of the robot devices comprises the expandable gripping device, the expandable gripping component is configured to be switchable between a normal state and an expanded state;

when the expandable gripping component is in the normal state, a size of the expandable gripping component is smaller than an inner size of the rigid ring structure such that the expandable gripping component is configured to be inserted into the rigid ring structure; and when the expandable gripping component is in the expanded state, the size of the expandable gripping component is expanded to fit the inner size of the rigid ring structure such that the expandable gripping component is configured to grip the rigid ring structure.

18. The method of claim 16, wherein a visual guiding structure is further provided for each of the rigid gripping components, and the visual guiding structure is configured to be detected by the computer vision system.

19. The method of claim 16, further comprising:

controlling the robot devices of the robot system to grasp the rigid ring structure of at least two of the rigid gripping components of the soft package, such that each of the rigid ring structure of at least two of the rigid gripping components of the soft package is grasped by one of the robot devices; and controlling the robot devices grasping the at least two of the rigid gripping components of the soft package to flip the soft package.

* * * * *